United States Patent
Brown

(10) Patent No.: US 6,985,480 B2
(45) Date of Patent: Jan. 10, 2006

(54) SYSTEM, SOFTWARE AND METHOD FOR IMPLEMENTING AN INTEGRATED, DEVICE INDEPENDENT, PACKET TELEPHONY FRAMEWORK SOFTWARE SOLUTION

(75) Inventor: David Thomas Brown, Coalville (GB)

(73) Assignee: Trinity Convergence, Inc., Morrisville, NC (US)

( * ) Notice: Subject to any disclaimer, the term of this patent is extended or adjusted under 35 U.S.C. 154(b) by 0 days.

(21) Appl. No.: 10/306,714

(22) Filed: Nov. 27, 2002

(65) Prior Publication Data

US 2004/0062233 A1    Apr. 1, 2004

Related U.S. Application Data

(60) Provisional application No. 60/415,217, filed on Oct. 1, 2002.

(51) Int. Cl.
*H04L 12/66* (2006.01)
(52) U.S. Cl. .......................... 370/352; 370/356
(58) Field of Classification Search ........ 370/351–356, 370/401, 466, 389, 503, 516, 395.5; 375/354, 375/371; 709/223, 224, 225, 230, 249
See application file for complete search history.

(56) References Cited

U.S. PATENT DOCUMENTS

| | | | | |
|---|---|---|---|---|
| 6,269,095 B1 * | 7/2001 | Neubauer et al. | ............ | 370/352 |
| 6,466,548 B1 * | 10/2002 | Fitzgerald | .................... | 370/249 |
| 6,563,599 B1 * | 5/2003 | Whitfield | .................... | 358/1.15 |
| 6,657,957 B1 * | 12/2003 | Cheung et al. | ............. | 370/230 |
| 6,658,027 B1 * | 12/2003 | Kramer et al. | ............... | 370/516 |
| 6,704,309 B1 * | 3/2004 | Nada et al. | .................. | 370/389 |

* cited by examiner

*Primary Examiner*—Ajit Patel
(74) *Attorney, Agent, or Firm*—Smith Frohwein Tempel Greenlee Blaha LLC

(57) ABSTRACT

A framework system serves to translate calls between dissimilar networks. More specifically, the framework system serves to translate calls between dissimilar packet networks and/or between a packet switch network and the public switched telephone network. The system includes a media engine module for terminating and handling channels of data transmitted between the networks in real time. An administrator module provides control and management interfaces for controlling processing applied to each channel. A conduit module serves to enable the distribution of software throughout the framework system allowing the distributed software to use interprocessor communication mechanism in the system. Optionally, a signaling engine module serves to provide access to call control information for connection between two networks.

19 Claims, 6 Drawing Sheets

SYSTEM, SOFTWARE AND METHOD FOR IMPLEMENTING AN INTEGRATED, DEVICE INDEPENDENT, PACKET TELEPHONY FRAMEWORK SOFTWARE SOLUTION

CROSS REFERENCE TO RELATED APPLICATIONS

This application is related to and claims priority to U.S. Provisional Application No. 60/415,217, filed Oct. 1, 2002, entitled "System, Software and Method for Implementing an Integrated, Device Independent, Packet Telephony Framework Software Solution," the disclosure of which is specifically incorporated by reference herein.

BACKGROUND OF THE INVENTION

1. Field of the Invention

This invention relates to the field of packet telephony, and in particular, for translating telephone calls between dissimilar networks, such as dissimilar packet switched networks or such as the translation of legacy telephone calls on the public switched telephone network into packets for transmission on packet networks, e.g., IP networks.

2. Description of the Background

With the development and proliferation of packet (IP and ATM) networks, there has arisen an opportunity of further deploying or communicating traditional telephone calls traditionally being communicated over the public switched telephone network (PSTN) as voice over packet (Voice over IP or Voice over ATM) communication on traditional data networks.

In such environments, when it is desired to translate between two or more networks, there is typically provided a gateway between the networks which translates the format of the voice, fax or data between the formats used in each of the networks.

Functionally the gateway must be capable of the following:
a. Terminate packet data;
b. Terminate circuit switched data;
c. Provide required media processing to translate between dissimilar networks including voice transcode, echo cancellation, tone detection and generation, tone relay over packet network, FAX relay, data format transcode;
d. Handle call establishment using circuit switched signaling protocols such as ISDN, SS7;
e. Enable commissioning and management of system from management console; and
f. Provide a control interface enabling control over call establishment and data routing through the system.

Gateways are normally constructed using a number of specialized processors with dedicated software to carry out the various functions outlined above. Processors typically used include Digital Signal Processors (DSPs), Network Processors (NPs) and Embedded Control Processors. The architecture is generally closed and there is a tight coupling between the processors used, their layout and interconnect, and the software running on each processor.

In the construction of a packet telephony gateway, it is common for a gateway manufacturer to license software components from a number of independent software suppliers. The software is typically targeted to a single processor or small selection of processors. Further, the software will typically impose constraints on how the processors are connected. Lastly, the software is typically "closed" and does not allow the gateway manufacturer to customize or extend the software for his own particular system.

In accordance with the invention described herein, there is provided a silicon platform independent gateway solution, realized using software that presents a number of Application Programmer Interfaces (APIs), enabling the easy customization and/or extension of the software system. Thus, the problems involved with the current solutions are avoided and a highly flexible solution is provided.

SUMMARY OF THE INVENTION

In accordance with the invention, there is provided a framework approach, in both hardware and software configuration, which permits gateway developers to innovate and customize their systems, while still using the software framework as the basis for their software. Hardware developers can design interprocessor communications mechanisms and other data transfer and peripheral access mechanisms, and the framework will support porting to these systems through suitable abstraction of physical interfaces. Software developers can extend the functionality of the packet telephony gateway framework with their own software.

More specifically, the architecture of the system and method described herein is made up of four distinct components or modules. A first component is what can be referred to as a Media Engine module responsible for the termination and handling (including transcoding and other media processing) of channels of data in real time. The system is scaleable and can be realized using an appropriate mix of Digital Signal Processors and Network Processors.

A small (low channel capacity) system can be realized using a single DSP capable of terminating packet and circuit switched data streams, without the need for a dedicated Network Processor. A large (high channel capacity) system can be realized using a Network Processor and array of Digital Signal Processors with a high speed interconnect between the Network Processor and the Digital Signal Processor(s).

The Media Engine includes a Data Manager function which provides termination for packet and circuit switched data channels. The Data Manager can be realized using an external device such as a Network Processor (or other general purpose processor capable of terminating packet and circuit switched channels) that is accessible from the DSP, or, using a software task on a DSP with suitable packet and circuit switched physical interfaces. A defined Data Manager Interface resident on the digital signal processor(s) allows data to be transmitted and received using the Data Manager. The Data Manager Interface provides a consistent data interface to the remainder of the DSP software, regardless of the realization of the Data Manager function. As will be readily apparent to those of ordinary skill in the art, the Data Manager can be split, so that packet data is terminated on an external Network Processor, and circuit switched data is terminated directly on the DSP. In this mode of operation the Data Manager Interface still provides the same, consistent interface.

Each DSP includes a Scheduler software component or module. The Scheduler is run periodically (typically every 10 ms, although this rate is configurable) and on each invocation receives input data for all channels from the Data Manager Interface, receives commands from the Administrator function (see below), modifies channel configuration based on received commands, provides input data to each channel, processes the input data for each channel and generates any required output data, receives output data for each channel, packages output data for transmission, transmits output data using the Data Manager Interface, receive responses or events from each channel, transmit response or events to the Administrator function.

Finally the first component, i.e., Media Engine, also includes the required Digital Signal Processor resident media translation and handling software—a collection of media processing algorithms. These algorithms are collectively known as the DSP Algorithm Library. The Scheduler invokes the functions in the Algorithm Library to carry out the required media processing for each channel. Each Algorithm in the DSP Algorithm Library uses a common Algorithm Interface. This is a "C" programming language interface which enables proprietary or third party supplied Algorithms that conform to the interface to be added to the framework to provide specific media handling capability. More specifically, this interface is open in nature, and this allows ease in conforming such proprietary or third-party supplied algorithms to be added to the framework.

The second component of the system is the Signaling Engine module which provides access to call control information for connection to a traditional circuit switched network, and is used in a packet-to-circuit gateway application. The Signaling Engine provides access to information governing call set up, tear down, etc., but is an optional component which can be eliminated for users which already have signaling systems, or where call establishment is controlled using an external signaling gateway, or where the system is a packet-to-packet gateway and there is no requirements for circuit switch conductivity. The Signaling Engine accesses Signaling Protocol Stacks using a common interface. This "C" interface enables protocol stacks from any supplier that conform to the interface to be added to the framework to provide support for a specific signaling protocol. As with the DSP Algorithm Library Interface, this "C" interface is also open in nature.

The third component is the Administrator module, which provides the control and management interfaces to enable control of the media processing applied to each channel, as well as control of call set up and termination. The control interface is a "C" Application Programmers Interface (API). Two varieties of management interface are supported—a "C" API or a Simple Network Management Protocols (SNMP) interface. Using the interfaces presented as part of the Administrator, a system developer can produce a control or management software application which meets the needs of their particular system. The Administrator control interface supports the integration of a standards-based Gateway Control Protocol. This interface is also open.

The fourth component is a Conduit which is a lightweight inter-entity messaging system which enables the software components (the Media Engine, Signaling Engine and Administrator) to be distributed across the various processors used to construct the system. The Conduit enables communication between the software components using the particular interprocessor communication mechanisms utilized in the system. The Conduit can be quickly ported to support a range of interprocessor communications mechanisms, and makes no assumptions about the physical medium that the messages are carried using.

As may be appreciated, the "open" nature of the system greatly facilitates gateway developer innovation and customization of their systems, while still using the framework system described herein as the basis for their software.

BRIEF DESCRIPTION OF THE DRAWINGS

Having thus generally described the invention, the same will become better understood from the following detailed description taken in conjunction with the drawings wherein.

DETAILED DISCUSSION OF THE INVENTION

Figure 1:
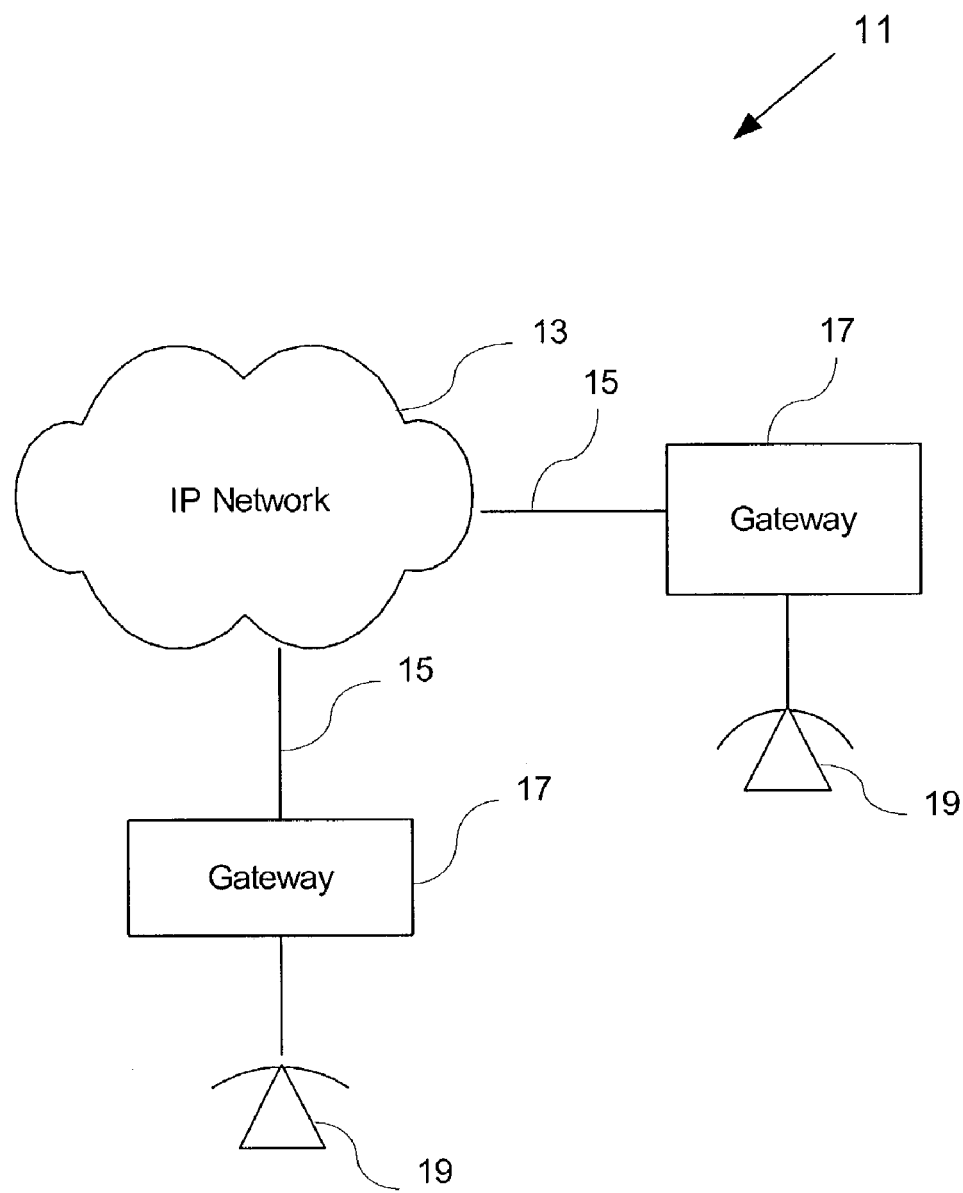
FIG. 1 illustrates a typical IP network connected through a gateway to the public switched telephone network.

FIG. 1 illustrates a typical arrangement 11 of an IP network 13 connected through connections 15 through gateway 17 to the public switched telephone network 19 on which the system and method described herein may be implemented. While the system is illustratively shown in FIG. 1 deployed between the public switched telephone network 19 and an IP network 13, it can also be implemented between dissimilar packet switched networks, as will be readily apparent to those of ordinary skill in the art.

Figure 2:
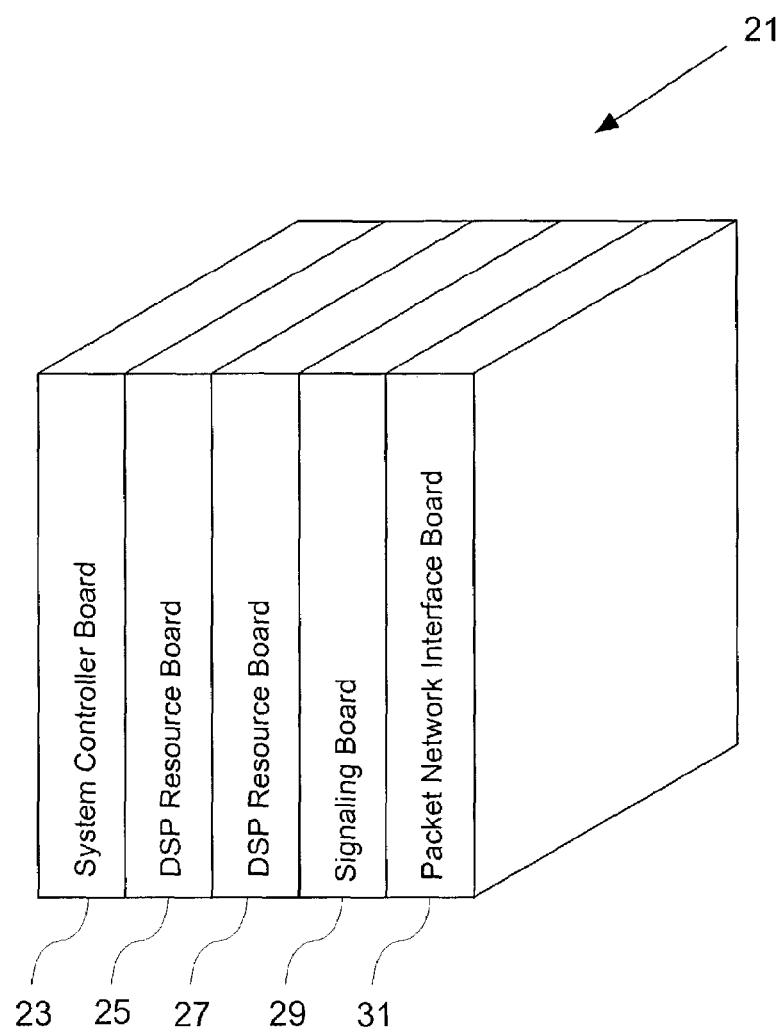
FIG. 2 illustrates a typical hardware module with its various components, with software on board, in accordance with the system and method described herein.

FIG. 2 illustrates a multi-board system 21 implementing the system and method described herein. The system 21 includes a controller which functions as previously described, and described in greater detail hereafter. Two DSP resource boards 25 and 27 are provided which also function as previously described. Board 29 is a signaling board which, in this case, provides the PSTN interface, and board 31 provides a network interface which essentially functions as the packet interface.

Having thus generally described the overall arrangement of the system and module 21, greater details are provided in the following discussion.

There is described herein an open packet-telephony software solution, offering a highly integrated and optimized set of software modules which provide the key software components required to build a packet telephony gateway.

A packet telephony gateway must provide the following high level functions:
a. Terminate Packet Streams;
b. Terminate TDM Streams;
c. Provide Media Stream Processing for terminated streams enabling "gateway" and "value added" services to be hosted on the platform;
d. Support signaling systems for call control on terminated data streams;
e. Provide System Controller software to manage the system;
f. Provide System Controller software to control media stream processing and call setup;
g. Provide inter-module communication to enable the system to be realized on a variety of target platforms, both closely coupled small systems and large scale distributed systems; and
h. Provide open interfaces to allow integration of third party components, including DSP based algorithms, signaling systems and gateway control protocols (e.g. SIP[1], MeGaCo[2]).

To provide this functionality the system has been architecturally decomposed into the following software components and functionality:

a. Media Engine Module—Terminates packet streams, circuit switched streams, and provide media stream processing. Allows the integration of third party DSP algorithms to customize the system as required.
b. Signaling Engine Module—Provides signaling systems for circuit switched connections. Supports the integration of third party signaling systems.
c. Administrator Module—Provides control over media stream processing and call setup. Provide management of entire system. Supports the integration of third party gateway control protocols.
d. Conduit Module—Inter-component messaging system allowing the system to be scaled and deployed on a variety of end-systems. Supports porting to a range of physical transports.

The remainder of this text describes the software architecture and individual software components in more detail.

Figure 3:
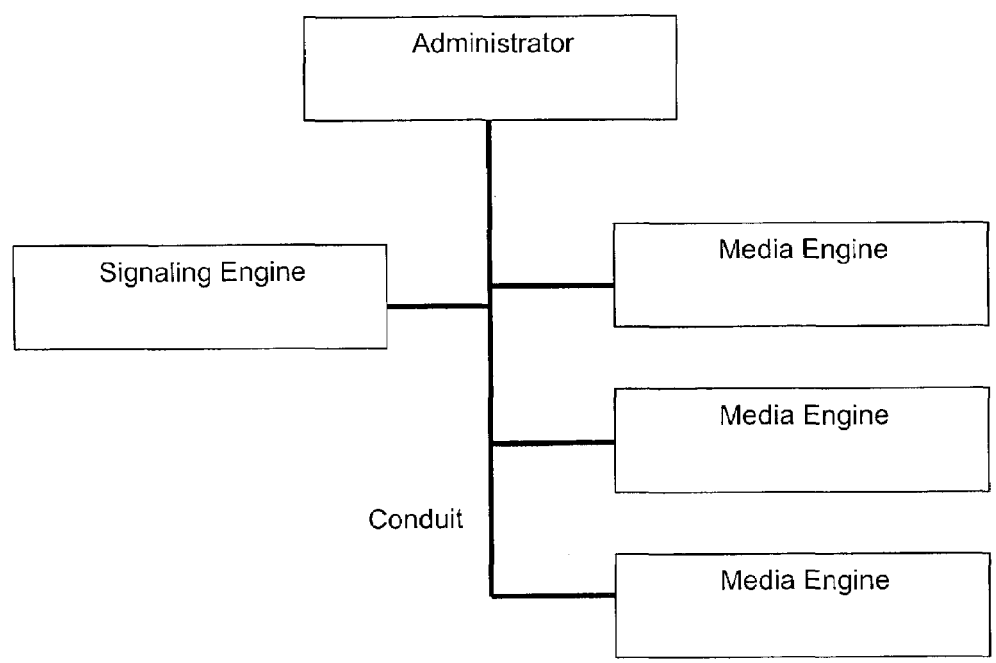
FIG. 3 is a view of the system architecture.

Architectural Overview. The software architecture is made up of four distinct components introduced in the previous section and shown in FIG. 3. It is important to note that the components illustrated are software components—no assumptions have been made about what type of processor(s) each software component runs on but implementation is readily apparent to those of ordinary skill in the art from the description herein.

To facilitate targeting the software architecture to a range of target platforms, the architecture makes use of appropriate abstraction techniques (e.g. conduit message system can be realized using different transports, Data Manager can be realized using different Network or General Purpose Processors). By identifying the "target platform specific" components, users or customers can quickly target the software to their end system with minimum changes to the overall software model.

The individual software components are described in greater detail in the following sections.

Figure 4:
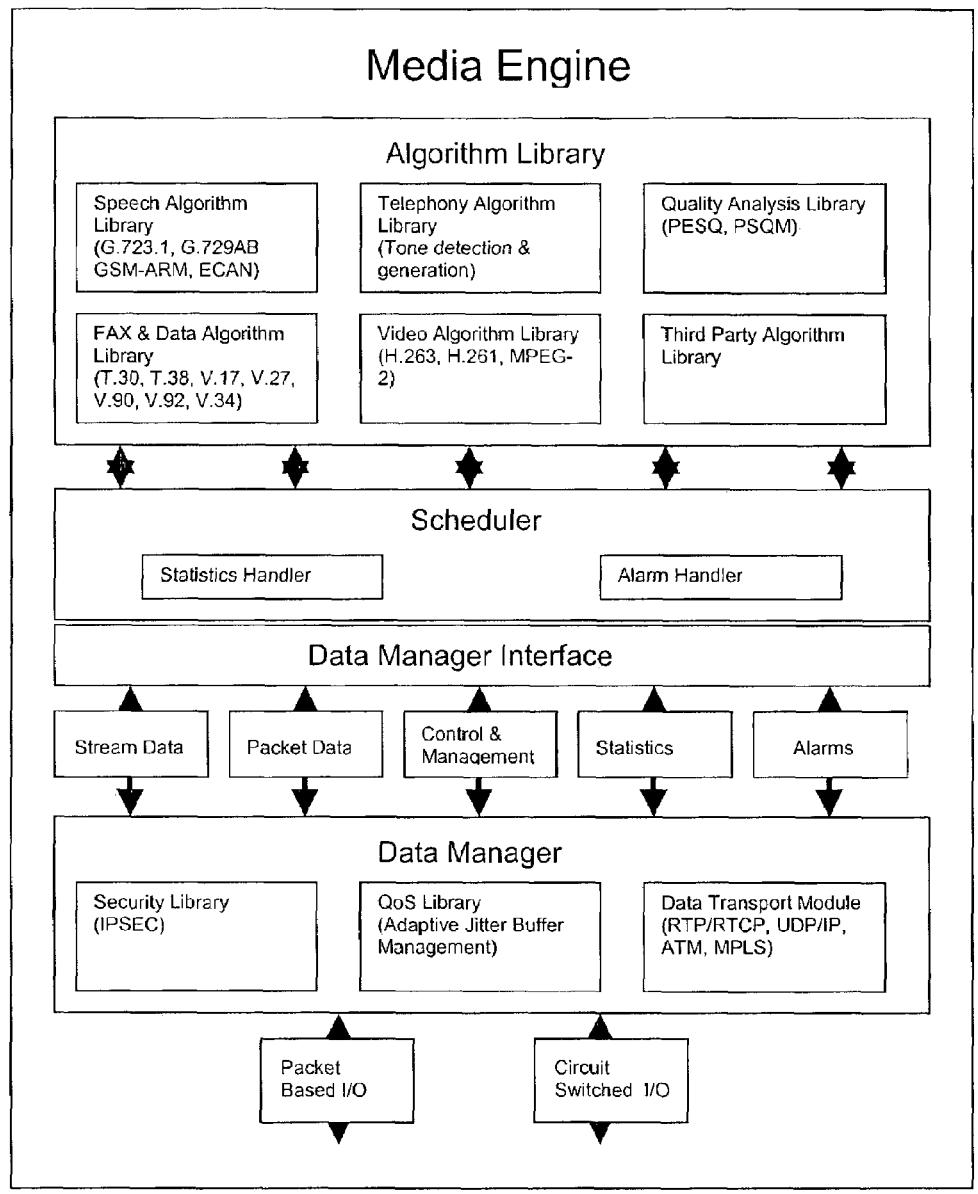
FIG. 4 is a view of the media engine architecture.

Media Engine. The architecture of the Media Engine is shown in FIG. 4. The Media Engine is responsible for the termination and handling of media streams in the architecture. Note that the terms "channel" and "media stream" are considered synonymous in this description. The real-time data handling requirements in a packet telephony system dictate that the data termination and media handling must be "closely coupled". In general this is achieved using a mix of closely coupled Network Processors (NP) and Digital Signal Processors (DSP) in an aggregator/DSP Farm Array with high-speed interconnect between the NP and DSPs, but for smaller systems this can be achieved using a DSP a DSP with data termination capabilities (e.g. Motorola MSC8101 [3]).

The system will contain at least one Media Engine. A number of Media Engines can be used to create a larger system, with all of the Media Engines controlled by a single Administrator. No assumptions are made about the location of Media Engine(s) in a system, nor are any assumptions made about the physical connection between the Media Engine(s) and the Administrator, again, the implementation being readily apparent to those of ordinary skill in the art from a reading hereof.

Referring to the software architecture diagram of the Media Engine, a large-scale (high channel capacity) systems can be constructed using a DSP Array connected to a single Network Processor (or aggregator). In this arrangement the functions described herein are distributed as follows:

EXAMPLE I

Data Manager. Packet interface provided using Network Processor TDM interface provided using software on each DSP in the array;
Data Manager Interface. Runs on each DSP in the array;
Scheduler. Runs on each DSP in the array; and
Algorithm Library. Runs on each DSP in the array.

Again, referring to the software architecture diagram for the Media Engine, a small (low channel density) system can be constructed using a single DSP, with the functions described herein are distributed as follows:

EXAMPLE II

Data Manager. Packet interface provided using software on the DSP TDM interface provided using software on the DSP;
Data Manager Interface. Runs on the DSP;
Scheduler. Runs on the DSP; and
Algorithm Library. Runs on the DSP.

It is clear from these two examples that by abstracting the Data Manager component and providing access to it through the Data Manager Interface (DMI), that essentially the same DSP resident software can be used in large, multi-device or small, single-device solutions.

The following sections describe in greater detail each of the elements that make up the Media Engine.

Data Manager. Data termination for a Media Engine is provided by the Data Manager component. This function is typically realized using a device capable of packet-processing, which is accessed from the DSP(s) using the Data Manager Interface resident on the DSP(s). If the DSP is capable of packet termination direct to the device (e.g. terminate 10/100 Ethernet on Motorola MSC8101) then the Data Manager packet interface can be provided using a software module running on the DSP. The Data Manager must provide sufficient functionality to terminate the packet stream (e.g. for RTP encoded frames carried over UDP the Data Manager will provide UDP/IP, ARP, ICMP, etc., and extract the RTP packet from the UDP packet). The Data Manager component can be easily extended to terminate a variety of packet interfaces (e.g. ATM, MPLS, etc.).

The Data Manager component is also responsible for the termination of circuit switched streams, if this access is required. This is typically provided using a software module running on the DSP to access the serial port(s) found on a typical DSP. It is also possible to provide access to circuit switched data through an external device which samples the circuit switched data and converts the data into a packet format. The packets are then handled as described previously.

To enable control over the Media Engine by the Administrator, the Data Manager is capable of sending and receiving messages over the Conduit. Conduit messages are not inspected or generated by the Data Manager—it merely provides the physical termination for the Conduit from which messages are passed to the required Scheduler on the DSP(s) for handling.

Data Manager Interface. The Data Manager Interface software resides on each DSP in a Media Engine. It provides a consistent interface to the packet and TDM streams providing data to the DSP, whether that Data Manager is provided locally (using a software module), or using a closely-coupled Network Processor.

The Data Manager Interface software component always offers the same interface to the Scheduler. This enables different versions of the Data Manager Interface to be created and maintained to support a variety of data termination options.

Scheduler. The Scheduler is a DSP resident executive (a simplified operating system) enabling a multi-channel system to be supported. The Scheduler creates and maintains the operation and data flow for "channels" (Media Streams) under the control of the Administrator. The Scheduler is non pre-emptive and is driven from a configurable, periodic event referred to as a "tick". The source of the tick is configurable, and no assumptions are made about the source of the tick. Typically the tick is provided by an on-chip timer, or by counting data frames captured on a synchronous interface. The Scheduler is invoked every tick and runs to completion, after which time it will carry out no further processing until the next tick is received.

The Scheduler creates channels by "chaining together" the required algorithms from the DSP Algorithm Library. The Schedulers operation on each invocation is outlined below:

a. Receive new input data from the Data Manager Interface;
b. Receive new commands from the Administrator;
c. Modify channel configuration (if required) based on commands;
d. Provide input data to each channel;
e. Process the input data and generate any output data;
f. Receive output data from each channel;
g. Pack output data for transmission;
h. Transmit new output to data to the Data Manager Interface; and
i. Receive any alarms or statistics from the channels and send them to Administrator.

The Scheduler supports a load balancing scheme to ensure maximum channel density on each DSP. The load balancing scheme operates by inspecting the data arrival rate (or block size) on the packet interface for each channel, and by understanding the complexity of the processing required for each channel. When the block size is greater than the tick rate, packets are not received on every tick. The Scheduler uses this fact to spread the packet handling evenly over the available slots. In addition, the scheduler uses the complexity of the processing for each channel to estimate the processing carried out at each tick, and again uses this information to distribute the channel handling evenly over the available slots.

The Scheduler also provides memory management functionality required by the algorithms in the Algorithm Library. The Scheduler allocates and de-allocates memory from different physical pools of memory available to the DSP and makes the memory available to each Algorithm as it runs. The Scheduler memory manager makes use of Direct Memory Access (DMA) to move data into the fastest available physical memory before the Algorithm runs, and informs the Algorithm where the memory is available, to provide maximum performance.

The Scheduler is written in portable "C" and is designed so that it can be quickly moved to any DSP device or architecture.

Adaptive Jitter Buffer Manager. If the system terminates a packet stream where jitter (variability in latency or delay) must be removed from the packet steam, then an Adaptive Jitter Buffer Manager (AJBM) is used. The AJBM can be provided as part of the Data Manager (in which the stream is de-jittered before data arrives at the Data Manager Interface), or can be run on the DSP. If the AJBM is run on the DSP, it is invoked by the Scheduler for each channel that must be de-jittered.

The AJBM operates by briefly holding the received packets in a buffer while jitter is removed from the stream and any out of order packets are re-ordered. In addition, any duplicate packets are deleted. Packets leave the AJBM in a stream which is as close as possible to the stream which was emitted from the original sender—that is, in the original order, with the original inter-packet gap. In operation, the AJBM software inspects the received packet stream and extracts time-stamp and sequence number, information for each packet. Using the time-stamp and sequence number the AJBM orders the packets in the jitter buffer. The size of the jitter buffer (that is, the number of packets are held in the jitter buffer before they are released) adapts based on the jitter in the incoming stream. The AJBM measures how far from a perfect, zero-jitter stream the actual received stream is. This measurement is used to generate a "jitter level". The size of the jitter buffer is increased as the jitter level increases, and the size of the jitter buffer is decreased as the jitter level decreases. The maximum and minimum sizes of the jitter buffer are configurable to optimize performance for the particular implementation. This mechanism ensures that when there is little or no jitter the buffer will adapt to its lowest setting, in which case the AJBM is adding the minimum delay, and when there is high jitter the buffer depth will increase to enable the AJBM to remove the jitter.

Algorithm Library. The Algorithm Library provides the media translation and handling software resources required to create a packet telephony system. The Scheduler invokes the DSP algorithms required for each channel in the Algorithm Library using a consistent interface—the DSP Algorithm Interface.

DSP Algorithm Interface. The DSP Algorithm Interface used in the system is a "C" callable interface. All algorithms used in the system conform to this interface. Algorithms are typically optimized by writing in assembly language, but the "C" callable interface is always maintained. The DSP Algorithm interface is open, and is generally available from Trinity Convergence. Algorithms which conform to the DSP Algorithm Interface can be quickly added to the system, and have no requirement to have any knowledge of the system other than the information presented through the Algorithm Interface. Existing Algorithms that do not conform to the DSP Algorithm Interface can be quickly added to the system by creating a "wrapper" around the existing algorithm so that it exposes a an interface that is compliant with the DSP Algorithm Interface. The open nature of the DSP Algorithm Interface, coupled with the ability to use the interface to quickly add Algorithms to the packet telephony software architecture allows tailored or customized packet telephony systems to be quickly developed.

The system provides an Algorithm Library with the following algorithms which are generally commercially available, for example, from Trinity Convergence, Inc.

a. G.711 Encode/Decode[6]
b. G.729A/B Encode/Decode [7]
c. G.723.1 Encode/Decode [8]
d. GSM-AMR Encode/Decode [9]
e. Voice Activity Detection
f. Comfort Noise Generation
g. DTMF Detection/Generation
h. Call Progress Tone Detection/Generation
i. G.165/G.168-2000 Echo Cancellation [10] [11]

Although these Algorithms have been identified as preferred, other like algorithms are also commercially available which provide similar functionality and can be substituted for those identified.

The DSP Algorithm Interface remains consistent across different DSP devices and architectures. This enables Algorithms written in "C" to be moved to another DSP with support for the framework, with little or no changes to the "C" code.

Figure 5:
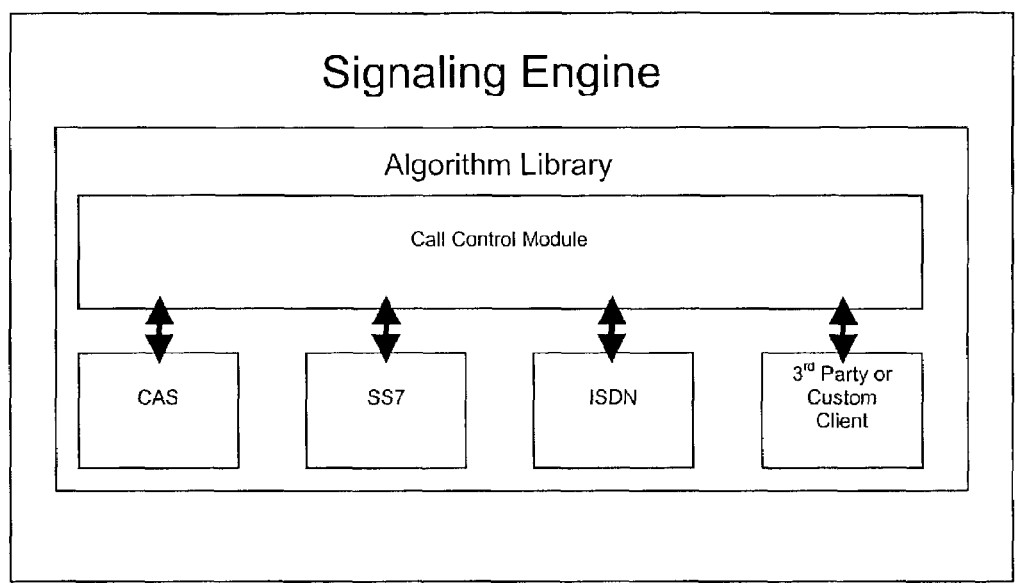
FIG. 5 is a view of the signaling engine architecture.

Signaling Engine. The Signaling Engine is shown in FIG. 5. The Signaling Engine provides access to call control information for connection of the system to a traditional circuit switched network. Where the system is used in a packet-to-circuit gateway application, the Signaling Engine provides easy and consistent access to information governing circuit switched call setup, teardown, etc.

The Signaling Engine is an optional component. It may be omitted for the following reasons:
 a. User already has signaling systems implemented and wishes to use/reuse them;
 b. Circuit switched call establishment is controlled using external signaling gateway or similar;
 c. System is a packet-to-packet gateway and there is no requirements for circuit switched connectivity.

The system may contain zero or more Signaling Engines. A number of Signaling Engines can be used to create a larger system, with all of the Signaling Engines controlled by a single Administrator. No assumptions are made about the location of Signaling Engine(s) in a system, nor are any assumptions made about the physical connection between the Signaling Engine(s) and the Administrator.

The Signaling Engine is typically realized using an embedded Control Processor, running a Real Time Operating System (RTOS) to enable the Signaling Engine to react in a timely manner to signaling events. The Signaling Engine consists of a single instance of the Call Control Module and one or more Signaling Systems.

Call Control Module. The Call Control Module interfaces between a signaling protocol stack and the Administrator. The Call Control Module presents an open Application Programmers Interface (API) that supports the integration of one or more Signaling Protocol Stacks. The Call Control Module converts between the call control commands, requests and events generated by each integrated Signaling Protocol Stack, and a defined set of messages which are communicated between the Administrator and the Call Control Module over the Conduit. The Call Control Module does not dictate which type of Signaling Protocol Stack can be used in the system, and supports the integration of a variety of Signaling Protocol Stacks.

Signaling Protocol Stacks. Signaling Protocol Stacks are integrated using the Call Control Module. Signaling Stacks may be Common Channel (such as CCITT Signaling System No. 7, or ETSI ISDN), Channel Associated (such as E&M Loop Start or R2), or proprietary (for example a simple signaling protocol driving an analogue phone line).

It is also possible to run the Signaling Engine under the control of the Scheduler on a DSP in a small system.

Figure 6:
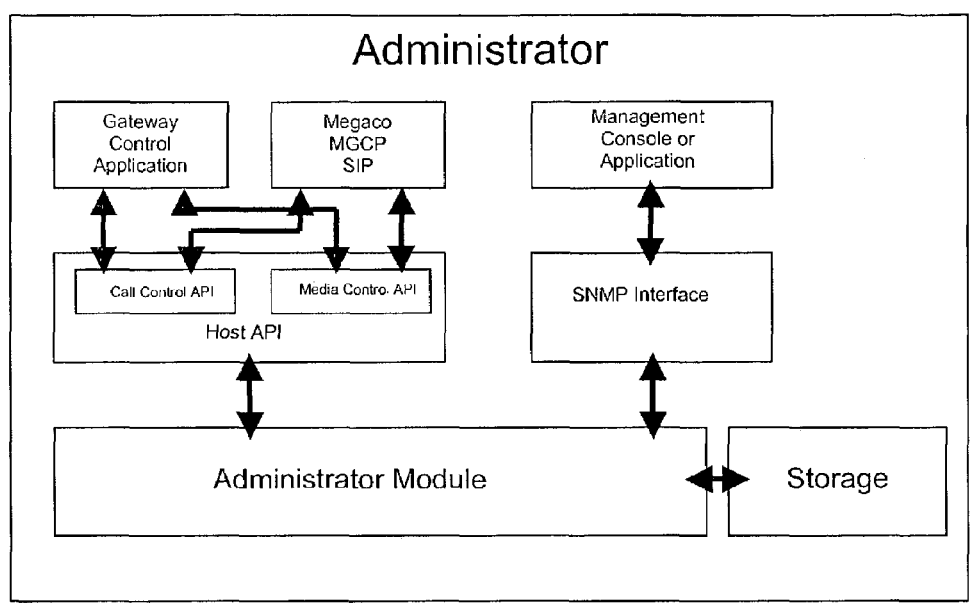
FIG. 6 is a view of the administrator architecture.

Administrator. The architecture of the Administrator is shown in FIG. 6. The Administrator provides the Control and Management interfaces for the system. The Control interface offers functionality which enables control of the media processing applied to each channel (through interaction with the Media Engine(s) in the system), and control of call setup and termination (through interaction with the Signaling Engine(s) in the system). This interface typically supports the integration of a standards-based Gateway Control Protocol (such as MeGaCo, SIP, etc.).

Similarly, the Management interface offers run-time operational & maintenance control over the System. This interface typically supports the integration of a customer specific management control protocol, or a standards-based management control interface (such as SNMP).

The system will contain one logical Administrator, although this potential single-point-of-failure can be removed by running the Administrator in a highly-available configuration (in which case the system can contain an "active" and "stand-by" Administrator).

The Administrator typically runs on a designated "System Controller" in a deployed system. In a multi-board backplane system, the Administrator is typically run on a General Purpose Processor on the shelf-controller, accessing Media Engines and Signaling Engines provided on other boards in the system. On a single board solution, a General Purpose Processor on the board usually runs the Administrator, providing control and management over locally accessible Signaling Engines and Media Engines.

The Administrator is written in portable "C" code to enable a rapid porting to a range of operating systems and Processors. The Administrator includes an Operating System Abstraction Layer, which removes the need for any other Administrator software elements to directly use features that are peculiar to a particular operating system. The operating system abstraction layer is available for a range of commercially available operating systems.

The following sections describe in some detail each of the elements that make up the Administrator.

Administrator Module. The Administrator Module maintains state information for all of the channels and components in the system, and communicates directly with each of the Media Engines and Signaling Engines to gather information, or to carry out actions requested through the API.

At system startup, the Administrator Module reads an initial configuration from the persistent storage and uses this to configure the other system components. If required, code (stored in the persistent storage) can be downloaded to the Media Engines and Signaling Engines by the Administrator Module to start the system.

At run time, the Administrator Module provides the necessary logical-to-physical mapping required to interface with the resources present on each Media Engine and Signaling Engine. An example of how this mapping is used is the resolution of the physical address of a particular channel in the system—i.e. the discovery of which physical card and processor the channel is running on.

Communication between each Media Engine or Signaling Engine and the Administrator is achieved using the Conduit.

Storage. The Administrator Storage component is a software module that provides a consistent access to persistent data used by the Administrator. Examples of persistent data include initial channel configurations, the Conduit addresses of all Media Engines and Signaling Engines in the system and executable code for download to Media Engines or Signaling Engines. The Storage component abstracts or provides abstraction from, (i.e., hides information about) the physical storage media and organization from the remainder of the Administrator. This approach allows the Administrator to be ported to a variety of platforms, and enables the system designer to select a suitable persistent storage solution for their end system. Examples of persistent storage include data stored in FLASH, a file on a local disk or a data-base accessed over a network. Access to data held by the Storage component is via the Storage Interface, and this interface remains consistent regardless of the underlying media or data organization. Data is requested using the Storage Interface by supplying a tag and receiving the associated data. Data is written to the Storage Interface by providing a tag and the data to be stored.

System Control API. The System Control API provides a control interface over the media processing and call handling in the system.

The System Control API is a "C" API that enables control "per channel" for all calls in the system, both for call setup and for media processing used in the channel.

Each physical channel in the system is represented by an object which can be manipulated using the functions exposed in the System Control API. As functions in the API are called to make changes to the object, the Administrator Module generates messages containing instructions which are sent to the physical channel on the Media Engine or Signaling Engine using the Conduit. On receipt of the message the requested control action is performed and a response is returned to the Administrator Module. On receipt of the response, the Administrator module updates the object representation of the channel, and if required, an indication is returned using the System Control API. Examples of characteristics of a channel that can be controlled using the API include, but are not limited to, selecting the type of voice encoder, selecting the gain, configuring the length of the echo cancellation tail, selecting whether FAX relay is enabled on a channel or not, etc.

The System Control API is also responsible for the communication of unsolicited events to the Control Application. For example, if the channel is configured to report detected DTMF digits, on detection of a digit a message is generated on the Media Engine and sent to the Administrator Module using the Conduit. On receipt of the message, a DTMF detected event will be informed using the API.

System Management API. The System Management API is similar in design and operation to the System Control API, but its functions enable management of the running system.

The System Management API is a "C" API that enables the request of management actions (such as shutdown or restart of a particular component), along with the ability to gather unsolicited events (such as alarms or statistics) from the components making up the system.

The System Management API has been designed to support the integration of standards-based management interfaces such as SNMP.

Conduit. The Conduit provides the message based control and management interface between the Administrator and each of the Media Engines and Signaling Engines making up a complete System.

Messages carried over the Conduit include a destination address. This address describes the physical location of the entity that the message must be delivered to.

The Conduit includes an abstraction layer that allows support for a variety of physical transports to be added to the Conduit. Regardless of the underlying physical transport, the Conduit always carries the same messages and uses the same addressing scheme. This approach allows the system to be used a variety of hardware platforms, with different interprocessor communication mechanisms. Example implementations include Conduit over Ethernet and Conduit over Shared Memory.

Two modes of operation are provided by the Conduit—reliable (for use over un-reliable physical media), and un-reliable (for use over reliable physical media).

Definitions. The following terms and acronyms have been used throughout this document as follows:

| | |
|---|---|
| AJBM | Adaptive Jitter Buffer Manager |
| AMR | Adaptive Multi Rate |
| API | Application Programmer Interface |
| ARP | Address Resolution Protocol |
| ATM | Asynchronous Transfer Mode |
| CCITT | Comité Consultatif international télégraphique et téléphonique (Consultative Committee on International Telegraphy and Telephony) |
| DMI | Data Manager Interface |
| DSP | Digital Signal Processor |
| DTMF | Dual Tone Multi Frequency |
| E&M | Ear & Mouth |
| ETSI | European Telecommunications Standards Institute |
| FLASH | Non-volatile memory technology |
| GSM | Global System for Mobile Communications |
| ICMP | Internet Control Message Protocol |
| IP | Internet Protocol |
| ISDN | Integrated Services Digital Network |
| ITU | International Telecommunication Union |
| MeGaCo | Media Gateway Control Protocol (ITU-T H.248) |
| MPLS | Multi Protocol Label Switching |
| NP | Network Processor |
| PCM | Pulse Code Modulation |
| PSTN | Public Switched Telephone Network |
| RTOS | Real Time Operating System |
| RTP/RTCP | Real Time Protocol/Real Time Control Protocol |
| SIP | Session Initiation Protocol |
| SNMP | Simple Network Management Protocol |
| SS7 | Signaling System No. 7 |
| TDM | Time Division Multiplex |
| UDP | User Datagram Protocol |

In addition, the following references may be referred to in understanding some of the descriptions set forth herein, the disclosures of which are specifically incorporated by reference herein.

1 Title: SIP: Session Initiation Protocol
Author: IETF Network Working Group
Ref: RFC 2543
Version: March 1999

2 Title: Gateway Control Protocol
Author: ITU-T
Ref: H.248
Version: June 2000

3 Title: Motorola MSC8101 Network Digital Signal Processor
Author: Motorola
Ref: MSC8101/D
Version: Rev. 2.0, August 2001

4 Title: Motorola MPC8260PowerQUICC II Technical Summary
Author: Motorola
Ref: MPC8260TS/D
Version: Rev. 2.2, October 2001

5 Title: Motorola MSC8102 Fact Sheet
Author: Motorola
Ref: MSC8102FACT/D
Version: Rev. 1

6 Title: Pulse Code Modulation (PCM) Of Voice Frequencies
Author: ITU-T
Ref: G.711
Version: November 1988

7 Title: Reduced Complexity 8 kbit/s CS-ACELP Speech Codec
Author: ITU-T

Ref: G.729A
Version: 11/96

8 Title: Speech coders: Dual Rate Speech Coder For Multimedia Communications
Transmitting At 5.3 And 6.3 kbit/s
Author: ITU-T
Ref: G.723.1
Version: March 1996

9 Title: Digital cellular telecommunications system (Phase 2+) (GSM);
Adaptive Multi-Rate (AMR);
Speech processing functions;
General description (GSM 06.71 version 7.0.2 Release 1998) GSM-AMR
Author: ETSI SMG 11
Ref: EN 301 703
Version: 7.0.2

10 Title: Echo Cancellers
Author: ITU-T
Ref: G.165
Version: March 1993

11 Title: Digital Network Echo Cancellers
Author: ITU-T
Ref: G.168
Version: 04/00

12 Title: Tornado 2—VxWorks 5.x Data Sheet
Author: Wind River Systems
Ref: MCL-DS-VXW-0107
Version: N/A 13 Title: V-interfaces at the digital Local Exchange (LE)—V5.2 interface (based on 2048 kbit/s) for the support of Access Network (AN)
Author: ITU-T
Ref: G.965
Version: 03/95

14 Title: Integrated Digital Loop Carrier System Generic Requirements, Objectives, and Interface
Author: Bellcore
Ref: GR-303
Version: Issue 04, Dec. 2000S

What is claimed is:

1. A framework system embodied in a computer-readable medium that when executed by one or more processors translates calls between dissimilar networks, comprising:
   a media engine module for terminating and handling channeling of data transmitted between dissimilar networks in real time, the media engine module comprising a data manager that when executed terminates data channels;
   an administrator module providing control and management interfaces for controlling processing applied to each channel of data by said media engine module; and
   a conduit module for enabling the distribution of the media engine and administrator modules throughout the framework system, allowing the distributed media engine and administrator modules to use interprocessor communication mechanisms used in the framework system.

2. The system of claim 1, further comprising a signaling engine module that when executed provides access to call control information for connection between a circuit switched network and a packet network.

3. The system of claim 1, wherein said media engine module is configured to transcode call information.

4. The system of claim 1, wherein when said data manager is executed both packet and circuit switched data channels are terminated.

5. The system of claim 1, wherein said data manager comprises an interface that when executed communicates with packet and circuit switched physical interfaces.

6. The system of claim 1, wherein the media engine module further comprises a scheduler module for receiving input data for all channels from the data manager, receiving commands from the administrator module and modifying channel configuration based on received commands, processing input data for each channel and generating required output data, receiving output data for each channel, packaging output data for transmission, transmitting output data using the data manager, receiving responses or events from each channel, and transmitting responses or events to the administrator.

7. The system of claim 1, wherein a control interface comprises a C Application Programmers Interface (C_API), and said management interface comprises one of a C_API or a Simple Network Management Protocol (SNMP) interface.

8. The system of claim 7, wherein said control interface and said management interfaces are open interfaces.

9. The system of claim 1, wherein said media engine module is distributed to and executes on network processors and digital signal processors with a high-speed interconnect between the network processors and the digital signal processors.

10. The system of claim 1, wherein said media engine module is executed by a digital signal processor having data termination capabilities.

11. The system of claim 1, further comprising a plurality of media engine modules.

12. The system of claim 1, wherein said media engine module further comprises a scheduler for creating and maintaining the operation and data flow for channels under control of the administrator module.

13. The system of claim 1, wherein said media engine module further comprises a scheduler for creating and maintaining the operation and data flow for channels under control of the administrator module.

14. The system of claim 13, wherein said scheduler invokes one or more functions in an algorithm library to carry out the desired media processing for each channel.

15. The system of claim 1, wherein said media engine module further comprises an adaptive jitter buffer manager module for removing jitter from packet streams.

16. The system of claim 15, wherein said adaptive jitter buffer manager module is part of the data manager.

17. The system of claim 2, wherein said signaling engine module comprises a call control module for converting between call control commands, requests and events generated by a signaling protocol stack, and a defined set of messages communicated between the administrator module and the call control module.

18. The system of claim 1, wherein said media engine module further comprises media translation and handling software modules making up a plurality of media processing algorithms, each algorithm having a common interface which is open in nature.

19. The system of claim 2, wherein said signaling engine module comprises an interface for accessing signaling protocol stacks.

* * * * *